Patented June 26, 1945

2,379,270

UNITED STATES PATENT OFFICE 2,379,270

LEAD SILICATE PIGMENTS AND METHODS OF MAKING SAME

Louis E. Barton, Windsor, Conn.

No Drawing. Application January 24, 1942,
Serial No. 428,035

13 Claims. (Cl. 23—110)

In my co-pending application Serial No. 359,769, filed October 4, 1940, I have disclosed that useful opaque lead silicate pigments can be made by heating a mixture of lead oxide, or a lead compound which upon heating yields lead oxide, and silica (silicon dioxide, $SiO_2$) under controlled temperature conditions whereby the reaction to form lead silicate takes place in the solid phase without fusion, thus ensuring a soft fine texture and other desirable physical qualities in the pigment product. Though the lead silicate pigments so made are substantially white or very light colored when freshly prepared they are not invariably stable to the action of light and may acquire a gray or gray-brown tone or color in a few hours under the action of direct sunlight or after a longer period in diffused light. In my United States Patents 2,233,042, February 25, 1941, and 2,236,051, March 25, 1941, I have disclosed methods of stabilizing lead silicate pigments against such discoloration which consist in adding small amounts of alkaline earth halides and alkaline earth oxides, respectively, to the mixtures of lead and silicon compounds before heating to combine them in the solid phase. In the former patent referred to I have also disclosed the accelerating effect upon the rate of reaction when alkaline earth halides are used and the superior quality of the resulting pigment products.

While such stabilizing and reaction-accelerating methods are very effective the processes have the disadvantage that if more than very small amounts of the stabilizing and accelerating compounds are used it is desirable to thoroughly wash the calcined pigments to remove water-soluble compounds remaining or which may be formed by reaction during calcination. Some of such compounds—for example, alkaline earth oxides—are difficultly soluble, requiring considerable time and much water to eliminate them from the product.

I have now discovered a process of accelerating the reaction in the formation of essentially pure lead silicates in the solid phase, whereby light-stable products are formed which are substantially free from or do not contain water-soluble compounds. My process in brief consists in making a mixture of such lead, silicon and halogen compounds as will upon heating supply to the product only the oxides of lead and silicon and the halogen, and then heating the mixture until the oxides combine in the solid phase to form an essentially pure lead silicate containing a chemically combined halogen. By the expression "essentially pure lead silicate" in this application I mean lead silicates consisting preponderantly of chemically combined lead and silicon oxides, a smaller amount of a halogen, no oxides other than lead and silicon and no other ingredients except it be traces of impurities derived from raw materials or equipment used in the process.

In the operation of my process I can use either litharge (PbO) or other compounds of lead which upon heating supply to the product only PbO, such, for example, as red lead ($Pb_3O_4$), lead peroxide ($PbO_2$) and white lead ($2PbCO_3.PbH_2O_2$). A pure grade of fine-grained silica is suitable. The silica may be either natural or artificially prepared and in either hydrous or anhydrous form. As the accelerating stabilizing reagent I can use either the free hydro acids of the halogen elements such as hydrochloric and hydrofluoric acids or other halogen compounds, such as ammonium halide salts, which by reaction during the process supply to the product only the halogen.

I use the accelerating-stabilizing halogen in the proportion of 0.2 to 5% based on the combined weight of lead oxide (PbO) and silica. Amounts as small as 0.1% are effective in stabilizing the product but do not greatly accelerate the reaction. Preferably the halogen should not be in excess of 5%, for, while larger amounts are effective they unnecessarily change the chemical composition of the pigment, reducing the percentage of lead silicate, the characteristic properties of which it is desired to retain.

I first thoroughly mix and mill the materials in the required proportions thereby reducing particle size and assuring a close association of ingredients. A porcelain or silex mill lining is satisfactory to avoid contamination of materials. In case a solid accelerator, such as an ammonium halide salt, is used, the charge may be dry-milled but preferably I first wet-mill the silica and lead compounds together and then add the halogen compound as a solution and continue milling for a short time thus forming a very homogeneous mixture. When the halogen compound is added as a solution the halogen combines immediately and completely with the lead compound. If the halogen compound is a solution of an ammonium salt, ammonia is liberated. The slurry discharged from the mill may be partially dewatered and dried if desired.

Either the wet pulp or the dry mixture is then charged into the heating furnace. A furnace lining of high-grade fire brick is satisfactory to avoid contamination of materials. Means should be provided for control of temperature. In furnaces where products of combustion contact the charge a neutral or oxidating flame should be maintained to avoid possible reduction of metallic oxides.

If the mixture of lead, silicon and halogen compounds has been prepared by dry-milling or blending, the reaction between the halogen and lead compounds takes place when the mixture is heated, and in case the halogen compound is an ammonium salt ammonia is evolved. The reaction between the halogen compound and lead oxide takes place at low temperatures and is rapid and complete before the charge has reached a temperature at which lead oxide and silica combine.

Lead oxide and silica react very slowly at a temperature of 500° C. but at 550° C. a white lead silicate pigment can be made by heating for a period of about 48 hours. While such temperatures are obviously impractical for making lead silicates from mixtures of lead compounds and silica only, even lower temperature can be used if an accelerating and stabilizing compound of the class before referred to is used. By using accelerators my lead silicate pigments can be made in the temperature range 400 to 725° C. Preferred temperature ranges for the different types of lead silicates with variations in amount and kind of reaction accelerators will be shown later by examples.

The time required in the calcining zone of the furnace depends upon the temperature and amount of accelerator used: the higher the temperature within the permissible range the shorter the time. The time required to complete the reaction may vary from 10 minutes to several hours but it is usually desirable to hold the charge at the proper temperature a little longer than appears absolutely necessary to insure that the reaction is complete. The progress of the reaction during calcination may be judged by withdrawing a sample from the furnace for inspection. The finished product should be substantially white and should not acquire a yellower or darker color upon milling or grinding the sample in a mortar.

Lead silicate pigments, if not calcined at too high a temperature, are soft in texture and fine enough to be used as pigments for paint, but usually milling is desirable to break down aggregates and develop full tinting strength and hiding power of the products. Either dry or wet-milling methods may be used. Preferably the calcined product is wet-milled and the slurry dewatered and dried.

My method of stabilizing lead silicate pigments and accelerating the reaction of their formation can be applied to essentially pure lead silicates of any desired composition. Not only can I make stable lead silicate pigments approximating the regular molecular proportions such as subnormal lead silicate, $PbSi_2O_5$, normal lead silicate, $PbSiO_3$, and basic lead silicate, $Pb_2SiO_4$, but I can also make equally useful lead silicates with any basicity desired between the regular normal and basic formulae or of any subnormal composition desired between the regular subnormal and normal formulae. I can also make useful lead silicate pigments containing a higher percentage of silica than the regular subnormal formula, $PbSi_2O_5$. In case an excess of either lead oxide or silica is used such excess may be chemically or physically combined or, possibly, partially in the free state. By the expressions normal lead silicate, subnormal lead silicate and basic lead silicate, as used in this specification and claims, I mean by normal lead silicate, a product having an equimolecular ratio of PbO to $SiO_2$, by subnormal lead silicate, a product having a ratio of PbO to $SiO_2$ less than equimolecular and by basic lead silicate a product having a ratio of PbO to $SiO_2$ greater than equimolecular. Lead silicate pigments other than the normal $PbSiO_3$, may contain, and some of them probably do contain, more than one definite chemical compound, the various silicates, basic, normal and subnormal, adjusting during the heating process proportionally in the product in accordance with natural laws to the state of most stable equilibrium.

The mechanism of the reactions whereby small amounts of the halogen compounds accelerate or catalyze the reaction in the formation of lead silicates and stabilize the resulting products is not definitely known, but some observations in the operation of the process and examination of the products indicate the nature of the combination of the halogen in the product. Rapid and complete combination of the halogen with the lead compound, as already explained, is confirmed by the fact that when the halogen compound is a free acid, for example hydrochloric acid, and mixed by wet-milling, the water separated from the solids is neutral to litmus notwithstanding the fact that normal lead chloride has an acid reaction and is appreciably soluble in water. Furthermore, the water contains no lead or chlorine. After the mixture has been calcined treatment of the product with water fails to extract any lead halide, although analyses have shown that substantially all the halogen added remains in the product. The finished pigment is neutral to litmus or possibly in some cases has a slightly alkaline reaction. These observations indicate that the halide is in fixed chemical combination, possibly as a highly basic lead halide.

The examples in the following table illustrate the working of my process. The charges were all proportioned to yield essentially pure normal lead silicates, using 78.80 parts of lead oxide (PbO) to 21.20 parts of silica. The nature and amount of accelerating-stabilizing halogen compound added is shown in column 2 of the table. The mixture in Example 2 was dry-milled: in all the other examples the mixtures were wet-milled and partially dried before transferring to the calcining furnace. The mixtures were calcined under the conditions shown in columns 3 and 4 of the table, in all cases yielding white products which were tested for completeness of reaction as before described. Column 5 shows the tinting strength of the products compared with standard white lead taken as 100. The products in all cases except that of Example 1 retained their white color when exposed to sunlight.

| Example No. | Reaction accelerator—per cent of mixture | Time calcined, hours | Temperature, °C. | Tinting strength, white lead=100 |
|---|---|---|---|---|
| 1 | None used | 48 | 550 | 105 |
| 2 | 5% ammonium chloride | 2 | 480 to 495 | 180 |
| 3 | 3% hydrochloric acid | 1 | 490 to 510 | 160 |
| 4 | do | 0.25 | 550 | 130 |
| 5 | 1.5% hydrochloric acid | 4 | 550 | 110 |
| 6 | 1% ammonium fluoride | 7 | 490 to 510 | 150 |
| 7 | 0.5% ammonium fluoride | 2 | 520 to 550 | 140 |
| 8 | 0.25% ammonium fluoride | 5 | 490 to 510 | 180 |
| 9 | 1% hydrofluoric acid | 4 | 450 to 470 | 150 |
| 10 | 5% ammonium bromide | 3 | 550 | 150 |
| 11 | 5% ammonium iodide | 3 | 550 | 170 |

The results in the foregoing table show that in all cases where a halogen has been added the time required for reaction is greatly reduced in comparison with Example 1 in which no accelerator was used. It is also clear that the use of the accelerators permits operation at lower temperatures. This fact is particularly important since the results in the table show clearly that, in general, the lower the calcining temperature the higher the tinting strength of the product.

The use of the stated halogen compounds, having the dual function of accelerating the reaction and stabilizing the reaction product, permits considerable variation in the calcining operation. Thus it is possible to complete the reaction between the lead compound and silica in the minimum time with relatively more of the halogen compound or with a similar amount to complete the reaction at a lower temperature in a somewhat longer period of time. On the other hand, the pigment may be stabilized with very small amounts of halogen compounds, the time for completion of the reaction depending on the temperature, and thus yielding a stabilized lead silicate pigment having a minimum content of the stabilizing compound.

The following examples, 12, 13, 14 and 15, show the application of my process in the preparation of lead silicate pigments having compositions other than normal compound. Example 16 illustrates the use in the process of lead compounds other than lead oxide (PbO).

Example 12.—Subnormal lead silicate

A mixture of 206 parts of lead oxide (PbO) and 169 parts of silica was wet-milled for 2.5 hours. 3.75 parts of actual hydrochloric acid (HCl), equal to 1% of the total of lead oxide and silica, diluted with 200 parts of water was then added and milling continued ½ hour longer.

The charge was washed from the mill with a little water, settled, the liquid decanted and the slurry was dried at about 100° C.

The dry mixture was calcined for 2 hours in the temperature range 480 to 500° C.

The calcined product was wet-milled for 2 hours then dewatered and dried at about 100° C.

|  | Per cent |
|---|---|
| Combined chlorine found by analysis | 0.91 |
| Composition of pigment: |  |
| Lead oxide (PbO) | 54.50 |
| Silica | 44.59 |
| Chlorine | 0.91 |

Tinting strength, 110 compared with a standard white lead taken as 100.

Example 13.—Subnormal lead silicate

A mixture of 55 parts of lead oxide (PbO), 45 parts of silica and 5 parts of ammonium chloride, equal 5% of the total of lead oxide and silica, was dry-ground until thoroughly blended.

The mixture was first calcined for 1 hour at a temperature of 400° C. when inspection showed that the reaction to form lead silicate was taking place but at a slow rate. The mixture was calcined 4 hours longer in the temperature range 400 to 440° C. when the reaction was complete.

The finished pigment had a tinting strength of 175 compared with a standard white lead taken as 100 tinting strength.

Example 14.—Subnormal lead silicate

A mixture of 350 parts of lead oxide (PbO) and 150 parts of silica was wet-milled for 2 hours. 5 parts of ammonium fluoride, equal to 1% of the total of lead oxide and silica, dissolved in 50 parts of water was then added and milling continued 1 hour longer.

The charge was washed from the mill, settled, excess water decanted and slurry dried at about 90° C.

The dry mixture was calcined for 1 hour in the temperature range 590 to 600° C.

The calcined product was wet-milled for 7½ hours, dewatered and dried.

|  | Per cent |
|---|---|
| Combined fluorine found by analysis | 0.45 |
| Composition of pigment: |  |
| Lead oxide (PbO) | 69.68 |
| Silica | 29.87 |
| Fluorine | 0.45 |

Tinting strength, 125 compared with a standard white lead taken as 100.

Example 15.—Basic lead silicate

A mixture of 85 parts of lead oxide (PbO) and 15 parts of silica was wet-milled with a solution of 5 parts of ammonium chloride. The slurry was dewatered by settling and decantation and the solids dried.

The mixture was then calcined for 3 hours at 570 to 590° C.

The calcined product had a slightly cream-white color and was very faintly alkaline to litmus.

|  | Per cent |
|---|---|
| Chlorine found by analysis | 3.03 |
| Composition of pigment: |  |
| Lead oxide (PbO) | 82.43 |
| Silica | 14.54 |
| Chlorine | 3.03 |

Tinting strength, 120 compared with a standard white lead taken as 100.

Example 16.—Normal lead silicate 4.57 parts of white lead ($2PbCO_3 \cdot PbH_2O_2$), equal to 3.94 parts of lead oxide (PbO), 1.06 parts of silica and 0.25 part of ammonium chloride, equal to 5% of the calculated weight of PbO and silica, were dry-ground to an intimate mixture.

The mixture was then calcined for 5 hours in the temperature range 500 to 550° C.

The calcined pigment had a cream white color and a tinting strength of 120 compared with a standard white lead taken as 100.

Two classes of white pigments are generally recognized: (1) The opaque white pigments, such as white lead, zinc oxide and titanium pigments which impart opacity and whiteness when mixed with oil or other organic vehicle; and (2) The extender pigments, such as whiting and china clay which do not impart appreciable opacity when similarly mixed with vehicles. My lead silicate pigments belong to the class of opaque white pigments and their properties adapt them for general application in oil, enamel and lacquer type paints and for other purposes where white pigments are used, such as for rubber, linoleum and other floor coverings, printing inks, vitrified enamel et cetera but I have found them particularly desirable for one preparation of exterior paints. Paints made with my lead silicate pigments ground with raw linseed oil vehicle are exceptionally durable when applied to either wood or metal surfaces and exposed to the weather.

I claim as my invention:

1. The method of making an essentially pure, opaque, white lead silicate pigment which comprises intimately mixing compounds which provide, on subsequent heating, only PbO, silica and a halogen, said halogen being in combination with a cation which is volatilized at the temperature of heating, and then heating the mixture at a temperature sufficiently high to chemically combine the lead oxide, silica and halogen in the solid phase without fusion to yield a lead silicate pigment containing said halogen in amount not greater than 5% of the total weight of PbO and silica.

2. The method of making an essentially pure, opaque, white lead silicate pigment which comprises intimately wet-mixing compounds which provide, on subsequent heating, only PbO, silica and a halogen, said halogen being in combination with a cation which is volatilized at the temperature of heating, and then heating the mixture at a temperature sufficiently high to chemically combine the lead oxide, silica and halogen in the solid phase without fusion to yield a lead silicate pigment containing said halogen in amount not greater than 5% of the total weight of PbO and silica.

3. The method of making an essentially pure, opaque, white lead silicate pigment which comprises intimately mixing compounds which provide, on subsequent heating, only PbO, silica and a halogen, said halogen being in combination with a cation which is volatilized at the temperature of heating, and then heating the mixture in the temperature range of 400 to 750° C. to chemically combine the lead oxide, silica and halogen in the solid phase without fusion to yield a lead silicate pigment containing said halogen in amount not greater than 5% of the total weight of PbO and silica.

4. The method of making an essentially pure, opaque, white, normal lead silicate pigment which comprises intimately mixing compounds which provide, on subsequent heating, only PbO, silica and a halogen, said halogen being in combination with a cation which is volatilized at the temperature of heating, and then heating the mixture at a temperature sufficiently high to chemically combine the lead oxide, silica and halogen in the solid phase without fusion to yield a normal lead silicate pigment containing said halogen in amount not greater than 5% of the total weight of PbO and silica.

5. The method of making an essentially pure, opaque, white, subnormal lead silicate pigment which comprises intimately mixing compounds which provide, on subsequent heating, only PbO, silica and a halogen, said halogen being in combination with a cation which is volatilized at the temperature of heating, and then heating the mixture at a temperature sufficiently high to chemically combine the lead oxide, silica and halogen in the solid phase without fusion to yield a subnormal lead silicate pigment containing said halogen in amount not greater than 5% of the total weight of PbO and silica.

6. The method of making an essentially pure, opaque, white, basic lead silicate pigment which comprises intimately mixing compounds which provide, on subsequent heating, only PbO, silica and a halogen, said halogen being in combination with a cation which is volatilized at the temperature of heating, and then heating the mixture at a temperature sufficiently high to chemically combine the lead oxide, silica and halogen in the solid phase without fusion to yield a basic lead silicate pigment containing said halogen in amount not greater than 5% of the total weight of PbO and silica.

7. The method of making an essentially pure, opaque, white lead silicate pigment which comprises intimately mixing compounds which provide, on subsequent heating, only PbO, silica and chlorine, the chlorine being in combination with a cation which is volatilized at the temperature of heating, and then heating the mixture at a temperature sufficiently high to chemically combine the lead oxide, silica and chlorine in the solid phase without fusion to yield a lead silicate pigment containing chlorine in amount not greater than 5% of the total weight of PbO and silica.

8. The method of making an essentially pure, opaque, white lead silicate pigment which comprises intimately mixing compounds which provide, on subsequent heating, only PbO, silica and fluorine, the fluorine being in combination with a cation which is volatilized at the temperature of heating, and then heating the mixture at a temperature sufficiently high to chemically combine the lead oxide, silica and fluorine in the solid phase without fusion to yield a lead silicate pigment containing fluorine in amount not greater than 5% of the total weight of PbO and silica.

9. The method of making an essentially pure, opaque, white lead silicate pigment which comprises intimately mixing compounds which provide, on subsequent heating, only PbO, silica and iodine, the iodine being in combination with a cation which is volatilized at the temperature of heating, and then heating the mixture at a temperature sufficiently high to chemically combine the lead oxide, silica and iodine in the solid phase without fusion to yield a lead silicate pigment containing iodine in amount not greater than 5% of the total weight of PbO and silica.

10. An essentially pure, water-insoluble, light-stable, opaque white lead silicate pigment comprising chemically combined lead oxide, silica and halogen, said halogen being in amount not in excess of 5% of the total weight of lead and silicon calculated as PbO and silica, formed by heating together, at a temperature sufficiently high to combine the lead oxide, silica and halogen in the solid phase without fusion, a mixture of compounds which provide on heating only lead oxide, silica and halogen, said halogen being in combination with a cation which is volatilized at the temperature of heating.

11. An essentially pure, water-insoluble, light-stable, opaque white lead silicate pigment comprising chemically combined lead oxide, silica and chlorine, said chlorine being in amount not in excess of 5% of the total weight of lead and silicon calculated as PbO and silica, formed by heating together, at a temperature sufficiently high to combine the lead oxide, silica and chlorine in the solid phase without fusion, a mixture of compounds which provide on heating only lead oxide, silica and chlorine, said chlorine being in combination with a cation which is volatilized at the temperature of heating.

12. An essentially pure, water-insoluble, light-stable, opaque white lead silicate pigment comprising chemically combined lead oxide, silica and fluorine, said fluorine being in amount not in excess of 5% of the total weight of lead and silicon calculated as PbO and silica, formed by heating together, at a temperature sufficiently high to combine the lead oxide, silica and fluorine in the solid phase without fusion, a mixture of compounds which provide on heating only lead oxide, silica and fluorine, said fluorine being in combination with a cation which is volatilized at the temperature of heating.

13. An essentially pure, water-insoluble, light-stable, opaque white lead silicate pigment comprising chemically combined lead oxide, silica and iodine, said iodine being in amount not in excess of 5% of the total weight of lead and silicon calculated as PbO and silica, formed by heating together, at a temperature sufficiently high to combine the lead oxide, silica and iodine in the solid phase without fusion, a mixture of compounds which provide on heating only lead oxide, silica and iodine, said iodine being in combination with a cation which is volatilized at the temperature of heating.

LOUIS E. BARTON.